M. D. WHIPPLE.
File.
No. 28,947.
Patented June 26, 1860.
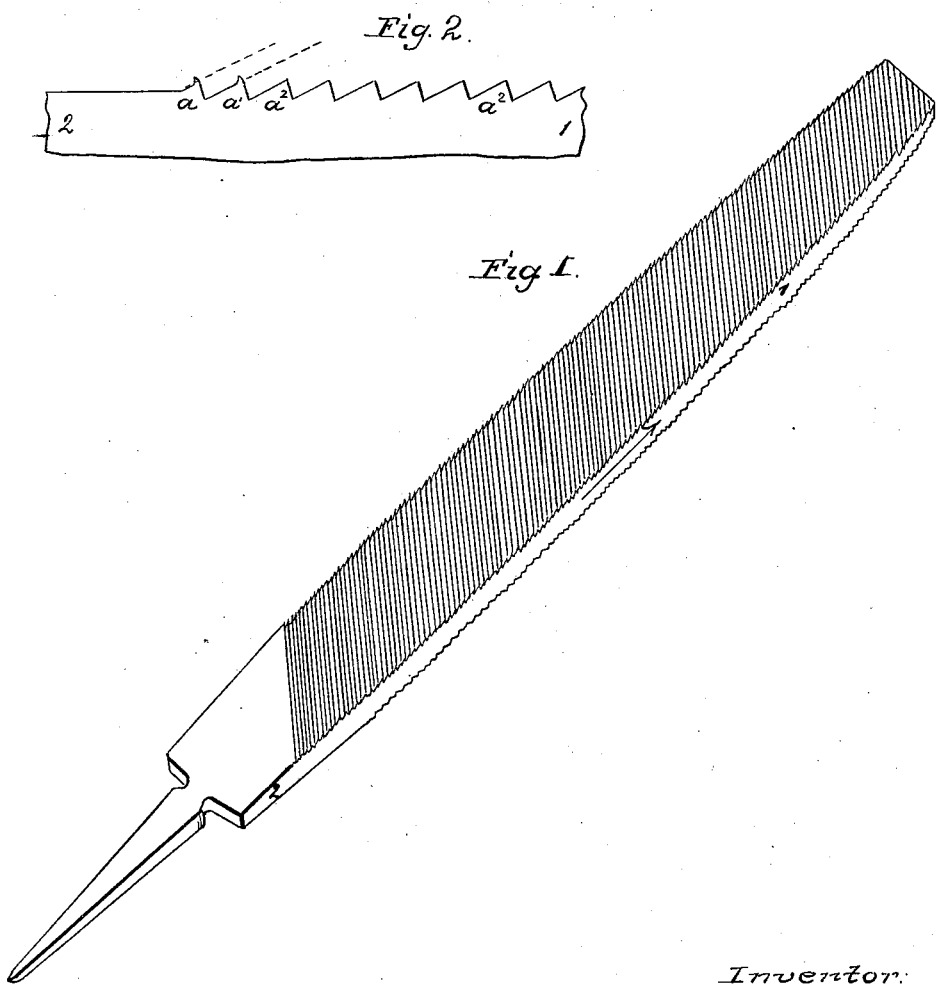

UNITED STATES PATENT OFFICE.

MILTON D. WHIPPLE, OF CHARLESTOWN, MASSACHUSETTS, ASSIGNOR TO THE WHIPPLE FILE COMPANY, OF MASSACHUSETTS.

MANUFACTURE OF FILES.

Specification of Letters Patent No. 28,947, dated June 26, 1860.

*To all whom it may concern:*

Be it known that I, MILTON D. WHIPPLE, of Charlestown, in the county of Middlesex and State of Massachusetts, have invented certain new and useful Improvements in Files, of which the following is a full, clear, and exact description, reference being had to the accompanying drawings, making part of this specification, in which—

Figure 1, is a view of a file having my improved form of tooth; Fig. 2, a view of the teeth enlarged.

In flat files as ordinarily made it has not been practicable to make every tooth of the same uniform height and with a smooth cutting edge, as either the force of the blow given to the chisel varied or the chisel was sharper at one part of the operation of cutting the file than at another, or the density of the metal of the blank varied at different parts; or as in some cases all these causes combined to make the file irregular so that it could not leave a smooth surface on the article filed with it. These difficulties I have overcome by my present invention which consists in a flat file, the edges of the teeth of which are sheared off smooth and of an uniform height.

That others skilled in the art may understand and use my invention I will proceed to describe the manner in which I have carried out the same.

The file represented in Fig. 1 is a "flat file" or single cut file, and is made in the improved file machine for which I obtained Letters Patent of the United States February 1st, 1859, in which machine each cut which raises or forms a tooth is made by the circular rolling cutter which passes diagonally across the face of the blank; the cut so made raises the surface of the metal of the blank as at $a$, Fig. 2, forming a bur similar to that made by the chisel in hand cut files (the cuts commence at the end 1, of the blank). If a succession of such cuts were made the teeth would be of the form shown at $a'$ Fig. 2, with the edge or top of the tooth rough and irregular. Instead of making this form of tooth I feed the blank in such a manner that the cutter as it moves across the blank will shear off the top of the tooth raised by the preceding cut and leave the tooth of the form shown at $a^2$, Fig. 2, with the back of the tooth at an angle with the front side of it, and the edges of all the teeth smooth and uniform in height.

A file having its teeth formed as above described will leave the surface operated on by it in filing much more even and true than one would in which the height of the teeth varied on different parts of the file, while the more perfect and regular the form of the tooth is the better it will operate and the more durable it will be. The same plan may be pursued in cutting "cross cut" files.

What I claim as my invention and desire to secure by Letters Patent as a new article of manufacture is—

A file having its teeth sheared off smooth and of an uniform height, substantially as specified.

MILTON D. WHIPPLE.

Witnesses:
   THOS. R. ROACH,
   P. E. TESCHEMACHER.